UNITED STATES PATENT OFFICE.

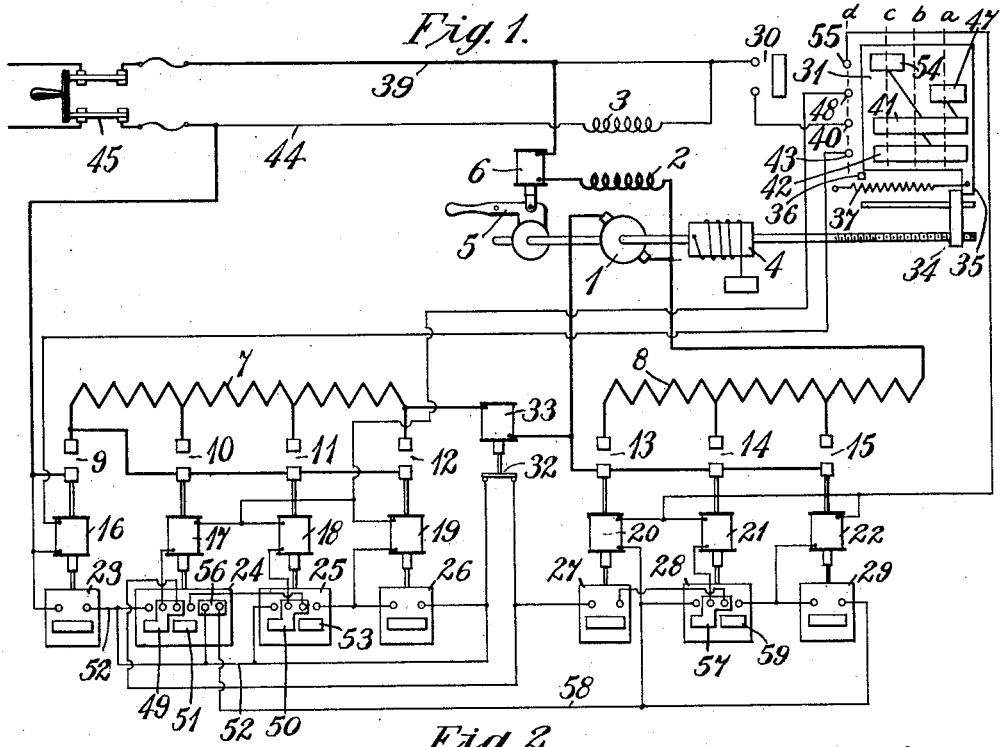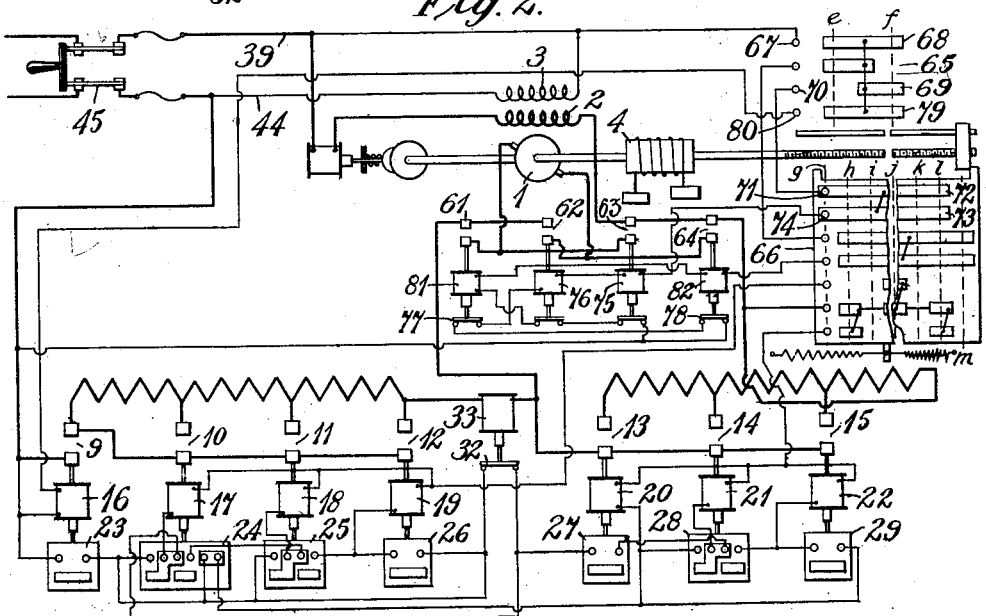

HENRY D. JAMES, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,150,035.   Specification of Letters Patent.   Patented Aug. 17, 1915.

Application filed February 3, 1910. Serial No. 541,829.

*To all whom it may concern:*

Be it known that I, HENRY D. JAMES, a citizen of the United States, and a resident of Pittsburgh, in the county of Allegheny and State of Pennsylvania, have invented a new and useful Improvement in Systems of Control, of which the following is a specification.

My invention relates to systems of control for electric motors, and it has for its object to provide a system in which a motor may be automatically stopped when it has made a predetermined number of revolutions or when a part driven thereby has reached a predetermined position.

When electric motors are employed for operating hoists, elevators and similar devices, it is often desirable to so control their operation that the motor will be stopped automatically when the driven member has arrived at a certain position. In order that this result may be accomplished effectively, and the driven member always be stopped at the same place, irrespective of the load provided thereby for the motor, I propose to reduce the voltage applied to the motor by steps or gradations, and, in such manner, that the voltage applied to the motor, and, consequently, the motor speed, will be substantially the same for certain of the steps at all loads.

My invention is illustrated in the accompanying drawings, Figure 1 of which illustrates, diagrammatically, a system embodying the same, in which the motor is adapted to drive the load in but one direction. Fig. 2 is a diagrammatic illustration of a system in which the motor is adapted to reverse and to drive the load in both directions.

The system of Fig. 1 comprises a motor having an armature 1, a series field magnet winding 2 and a shunt field magnet winding 3; a load for the motor, such as a hoist drum 4 that is driven thereby in but one direction and is operated in the opposite direction by gravity acting upon a weight raised thereby; a brake 5 that may be released manually to permit of lowering said weight, or automatically by an electromagnet, the winding 6 of which may be connected in series with the series field magnet winding 2 or in any other relation so that it will be energized when the motor circuits are established to permit the motor to raise the said weight; a resistance 7 that is adapted to be connected in series with the motor; a resistance 8 that is adapted to be connected in shunt to the motor armature; a set of independently actuated switches 9, 10, 11 and 12 for regulating the series resistance 7; a set of independently actuated switches 13, 14 and 15 for regulating the shunt resistance 8; actuating or controlling magnet windings 16 to 22, inclusive, for the respective switches 9 to 15, inclusive; interlocking switches 23 to 29, inclusive, that are operated by the respective switches 9 to 15, inclusive; a master switch 30 for regulating the circuits of the windings 16 to 22, inclusive, a controller 31 that is operated by the motor and serves to control the circuits of the magnet windings 16 to 22, inclusive; and a relay switch 32 having an actuating magnet winding 33 that is connected in series with the motor, the said relay switch serving also to govern the circuits of the magnet windings 16 to 22, inclusive.

The operative connection between the motor and the controller 31 may be of any suitable form, such, for instance, as a nut 34 that is operated longitudinally of a threaded extension of the motor shaft and is brought into engagement with a lug 35 upon the movable member of the controller when the motor has made a predetermined number of revolutions, or when the load upon the hoist has reached a predetermined position, the lug 35 being normally maintained in engagement with a stop 36 by a spring 37. The controller 31 is adapted to occupy a number of positions or steps, which are indicated by the broken lines *a*, *b*, *c* and *d*, as the load upon the hoist approaches its limiting position, the controller thereby serving to gradually reduce the speed of the motor and to bring it to a stop.

The operation of the system can be best understood from a detailed description of its circuits under the different conditions which may exist. As illustrated, the motor has been brought to a stop because of the raising of the load to its uppermost limit and, in order, therefore, to arrange for the application of current to the motor, it is necessary to release the brake 5 and permit lowering of the load. The spring 37 then moves the controller 31 from right to left, so that when the load has been completely lowered, or lowered a predetermined distance, the conducting segments of the controller will engage the stationary contact terminals thereof upon the position-indicating line *a*. The motor may then be started, so as to again raise the load, by closing the switch 30. A circuit is thus established from supply circuit conductor 39, through the master switch 30, stationary contact terminal 40, segments 41 and 42, and contact terminal 43 of the controller 31, and magnet winding 16 to supply circuit conductor 44. The switch 9 then closes and a circuit is established, through the motor, from the supply circuit conductor 39, brake magnet winding 6, series field magnet winding 2, armature 1, relay magnet winding 33, all of resistance 7 and switch 9 to supply circuit conductor 44. The shunt field magnet winding 3 of the motor is energized as soon as the main circuit switch 45 is closed, and, upon establishment of the circuit last described, the motor 1 will start, the brake 5 being released by reason of the energization of the magnet winding 6.

If the current which traverses the magnet winding 33 of the relay switch 32 is less than a predetermined amount, another circuit is established as soon as the switch 9 is closed, the controller 31 occupying the position *a*, which circuit extends from supply circuit conductor 39, through the master switch 30, contact terminal 40, conducting segments 41 and 47, and contact terminal 48 of the controller 31, magnet winding 17, relay switch 32, conductor 52, and interlocking switch 23 to supply circuit conductor 44. Energization of the magnet winding 17 causes it to close the switch 10 and thus remove a section of the resistance 7 from the circuit of the motor to permit an increase in the motor speed.

When the switch 10 closes, the interlocking switch 24, which is carried thereby, establishes a circuit for the operating magnet winding thereof that is independent of the relay switch 32, the said circuit extending, as before described, to the contact terminal 48 and from thence through the winding 17, conducting segment 49 of the interlocking switch 24, conductor 52, and interlocking switch 23 to the conductor 44. The interlocking switch 24 also establishes a circuit for the magnet winding 18 which extends from contact terminal 48 through the said winding, conducting segment 50 of interlocking switch 25, conducting segment 51 of the interlocking switch 24, relay switch 32, conductor 52 and interlocking switch 23 to the conductor 44. The switch 11 then closes, thereby removing another section of the resistance 7 from the motor circuit and permitting a further increase of the speed of the motor.

Upon closing the switch 11, the interlocking switch 25, that is operated thereby, establishes a circuit for the winding 18 that is independent of the relay switch 32, the said independent circuit extending from the winding 18 through the conducting segment 50 of the interlocking switch 25, conductor 52, and interlocking switch 23 to the conductor 44. The interlocking switch 25 also serves to establish the circuit of magnet winding 19, which circuit extends from contact terminal 48, through the winding 19, segment 53 of the interlocking switch 25, segment 51 of the interlocking switch 24, relay switch 32, conductor 52 and the interlocking switch 23 to the conductor 44.

The magnet winding 19, when energized, closes the switch 12, and all of the resistance 7 is then removed from the motor circuit. Upon closing the switch 12, the interlocking switch 26, that is operated thereby, establishes a circuit for the magnet winding 19 independent of that through the relay switch 32, which circuit extends from the said magnet winding through the interlocking switch 26, conductor 52, and interlocking switch 23 to the conductor 44. It will be understood that, if the current which traverses the magnet winding 33 exceeds a predetermined amount, the relay switch 32 will be opened, and the closing of additional switches will be prevented until the current has again fallen below the said predetermined amount.

As the load upon the motor approaches its limit of travel, the nut 34 is moved into engagement with the lug 35 that is carried by the controller 31, and the controller is gradually moved from position *a* to position *b*. The contact terminal 48 thereof then no longer engages conducting segment 47, and the circuits of magnet windings 17, 18 and 19 are therefore interrupted. All of the resistance 7 is then inserted in the motor circuit and the speed of the motor decreases. As the motor load approaches still nearer its limit of travel, the controller 31 is moved from position *b* to position *c*, thus causing conducting segment 54 to engage stationary contact terminal 55. A circuit is then established from conductor 39 through the master switch 30, stationary contact terminal 40, conducting segments 41 and 54, contact terminal 55, magnet winding 20, conducting segment 56 of the interlocking switch 24, conductor 52 and interlocking switch 23 to the conductor 44. Energization of the magnet winding 20 causes the switch 13 to close, and the resistance 8 is then connected in shunt to the armature 1, thus causing a reduction of the potential between the terminals of the motor armature and a reduction of its speed.

If the current which traverses the magnet winding 33 is less than a predetermined amount, the interlocking switch 27 will, upon closing of the switch 13, establish the circuit of the magnet winding 21, which circuit extends from contact terminal 55 through the said magnet winding, conducting segment 57 of the interlocking switch that is operated by the switch 14, interlocking switch 27, relay switch 32, conductor 52, and interlocking switch 23 to conductor 44. Upon energization of the magnet winding 21, switch 14 is closed, and a section of the resistance 8 is shunted, so that the drop of potential between the terminals of the armature is still further reduced, as is also the armature speed. Upon closing the switch 14, a circuit is established for the magnet winding 21, which is independent of the relay switch 32, which circuit extends through the conducting segment 57 of the interlocking switch 28, conductor 58, conducting segment 56 of the interlocking switch 24, conductor 52 and interlocking switch 23, to the conductor 44. If the current which traverses the magnet winding 33 is less than a predetermined amount, another circuit will be established from the contact terminal 55, through magnet winding 22, conducting segment 59 of the interlocking switch 28, interlocking switch 27, relay switch 32, conductor 52, and interlocking switch 23 to conductor 44. The magnet winding 22 is then energized, and switch 15 is closed, thus shunting another part of the resistance 8 and causing a still further reduction of the speed of the motor. Upon closing the switch 15, a circuit is established for the magnet winding 22 which is independent of the relay switch 32, the said circuit extending through interlocking switch 29 that is operated by the switch 15, conductor 58, conducting segment 56 of the interlocking switch 24, and interlocking switch 23 to the conductor 44.

The number of switches in the set 13—14—15 that will close will be dependent, of course, upon the amount of current that traverses the relay magnet winding 33, which, in turn, depends upon the load upon the motor, the relay 32—33 serving to maintain the current which traverses the resistance 7 substantially constant. With a constant current in the resistance 7, the drop of potential between its terminals will also be constant, and, since the voltage of the line 39—44 is constant, the difference of potential between the terminals of the motor armature will also be substantially constant. The speed of the motor will then be substantially the same for all loads when the controller occupies position c, and, consequently, it may be reliably stopped at substantially the same place, irrespective of its load. As the motor continues in operation, though at a reduced speed, the controller 31 is moved from position c to d, where the contact terminals and the conducting segments thereof become disengaged. The circuits of the magnet windings of all of the switches are then interrupted and the motor circuit is opened, including the circuit of the brake magnet winding 6. The brake 5 is then applied, and the motor is brought to a stop. It will be noted that the relay 32—33 serves to govern the circuits of both sets of resistance switches, and also that the conducting segment of the interlocking switch 24 that is operated by the switch 10 is in circuit with the magnet windings 20, 21 and 22, and, accordingly, prevents closing of switches 13, 14 and 15, except when the switch 10 is open. Both sets of resistance switches, therefore, cannot be closed at the same time.

The system of Fig. 2 differs from that of Fig. 1, in that it is provided with a set of switches 61, 62, 63 and 64 for establishing the motor circuits for either direction of rotation, so that the motor may be employed for driving a load in either direction. The master controller 65 and the controller 66, that is operated by the motor, are also different from the corresponding parts in the system of Fig. 1, in order that they may provide for controlling the switches 61, 62, 63 and 64. The master switch 65 has two positions e and f, and the controller 66 has seven positions g, h, i, j, k, l and m, the position j being that for high-speed operation of the motor, and the three positions upon either side thereof being respectively for two slow speeds and for stopping the motor. In order to start the motor when the parts occupy the positions illustrated, the master controller 65 should be moved to the position f whereupon a circuit is established from the conductor 39, through contact finger 67, conducting segments 68 and 69, contact finger 70 of the master controller 65, contact finger 71, conducting segments 72 and 73, and contact finger 74 of the controller 66, magnet windings 75 and 76, and interlocking switches 77 and 78 to the conductor 44. Another circuit is also established from conductor 39, through finger 67, segments 68 and 79, finger 80, and magnet winding 16 to conductor 44. The switches 9, 62 and 63, are then closed, and the motor is operated in a direction to permit movement of the controller from position g to position h, and, as the motor continues its operation, the controller is moved to the next succeeding positions, gradually increasing its speed at the same time. As the load operated by the motor approaches its upper limit of travel, the controller is moved from position j to, and through, positions k, l and m, successively, in which latter position it is brought to a stop. Then, in order to cause the motor to operate in the other direction, the master controller is moved to position e, whereupon the circuits will be established for magnet windings 81 and 82 of the switches 61 and 64 in a manner similar to that above described for magnet windings 75 and 76 of the switches 63 and 62, which establishes the motor circuits for the reverse direction of rotation. The operation of the remainder of the system will be readily understood because of its substantial identity with that of Fig. 1.

I claim as my invention:

1. A system of control comprising a motor, a resistance, a switch for connecting the same in series with the motor, a set of independently actuated switches for regulating the resistance, a second resistance, a set of independently actuated switches for connecting the same in shunt to the motor and for regulating the same, the said switches being adapted to make the said connections of the resistances simultaneously, and a common means governing the operation of both sets of switches.

2. A system of control comprising a motor, a resistance in series therewith, a resistance in shunt to the motor, sets of independently actuated switches for simultaneously establishing the said connections of the resistances and for regulating the same, and means for preventing closing of the switches in each of said sets except when predetermined conditions exist.

3. The method of regulating the operation of an electric motor which consists in adjusting the value of a resistance in shunt to the armature thereof in accordance with the amount of current traversing another resistance connected in series with the armature.

4. A system of control comprising a motor, a resistance in series therewith, a resistance in shunt thereto, sets of independently actuated switches for regulating the said resistances, and means for preventing closing of the switches in each of said sets except when the current traversing the resistance that is in series with the motor is less than a predetermined amount.

5. A system of control comprising a motor, a resistance in series therewith, a resistance in shunt thereto, sets of independently actuated switches for simultaneously establishing the said connections of the resistances and for regulating the same, and means for preventing closing of switches of one set when a switch of the other set is closed.

6. A system of control comprising a motor, a resistance in series therewith, a resistance in shunt thereto, sets of independently actuated switches for simultaneously establishing the said connections of the resistances and for regulating the same, means for preventing closing of switches that govern the shunt resistance when a switch of the set that governs the series resistance is closed.

7. A system of control comprising a motor, a resistance, a switch for connecting the same in series with the motor, a resistance in direct shunt to the motor, sets of independently actuated switches respectively for regulating the values of the said resistances, and a controller for the said switches that is actuated by the motor and is adapted to cause but one set of switches to close at a time.

8. The method of regulating the operation of an electric motor which consists in adjusting the value of a resistance in shunt to the motor armature to maintain substantially uniform the current traversing a resistance in series therewith.

9. A system of control comprising a motor, two resistances, means for connecting the same respectively in series with and in shunt to the motor, means respectively for regulating the values of said resistances, and common means for controlling the operation of both of said regulating means.

10. A system of control comprising a motor, two resistances, means for connecting the same respectively in series with and in shunt to the motor, means respectively for regulating the values of said resistances, and a single relay for controlling the operation of both of said regulating means in accordance with the amount of current traversing the said motor.

11. A system of control comprising a motor, two resistances, means for connecting the same respectively in series with and in shunt to the motor, means respectively for regulating the values of said resistances, and a single relay for controlling the operation of both of said regulating means.

In testimony whereof, I have hereunto subscribed my name this 26th day of January, 1910.

HENRY D. JAMES.

Witnesses:
HAROLD B. McWETHY,
B. B. HINES.

Copies of this patent may be obtained for five cents each, by addressing the "Commissioner of Patents, Washington, D. C."